United States Patent [19]

Pegouret

[11] Patent Number: 5,104,498
[45] Date of Patent: Apr. 14, 1992

[54] ELECTROLYTIC SYNTHESIS OF METAL SALTS OF WEAK ACIDS

[75] Inventor: Jean Pegouret, Paris, France

[73] Assignee: Saint-Gobain Recherche, Aubervilliers Cedex, France

[21] Appl. No.: 294,247

[22] Filed: Jan. 6, 1989

[30] Foreign Application Priority Data

Jan. 8, 1988 [FR] France ............... 88 00131

[51] Int. Cl.⁵ ............................................. C25B 1/22
[52] U.S. Cl. ........................... 204/59 R; 204/59 QM
[58] Field of Search ............... 204/59 R, 59 QM, 78, 204/79

[56] References Cited

U.S. PATENT DOCUMENTS

| | | | |
|---|---|---|---|
| 1,879,842 | 9/1932 | Conradty | 204/252 |
| 3,964,983 | 6/1976 | Eisenbach et al. | 204/59 QM |
| 4,104,140 | 8/1978 | Eisenbach et al. | 204/78 |
| 4,647,349 | 3/1987 | Kreh et al. | 204/59 R |
| 4,859,499 | 8/1989 | Sauvinet | 427/108 |

FOREIGN PATENT DOCUMENTS 2260658  4/1974  Fed. Rep. of Germany.

OTHER PUBLICATIONS

Habeeb et al., "Co-ordination Compounds of Indium. Part XXI. Some Compounds Derived from Indium Acetate, including Indium Diacetate", J. Chem. Soc., Dalton Trans. (3), pp. 243-247 (1973).

Baizer et al., "Organic Electrochemistry an Introduction and a Guide" 2nd ed. Marcel Dekker, Inc, N.Y. pp. 211-214, 601-602.

Primary Examiner—John Niebling
Assistant Examiner—Steven P. Marquis
Attorney, Agent, or Firm—Pennie & Edmonds

[57] ABSTRACT

The invention relates to the synthesis of metal salts of weak acids and in particular indium formate.

It proposes a process in which the anodic oxidation of metal is achieved under the effect of electric current in a cell filled with an electrolytic solution containing weak acid whose salt it is desired to produce, having at least its anode or anodes consisting of metal whose salt it is desired to produce. The salt is available in suspension in the electrolytic solution.

The invention also proposes an electrosynthesis cell, as well as products synthesized in a particular morphology.

The invention applies itself to the synthesis of indium formate in particular to pyrolyze it as a thin layer on glass.

5 Claims, 2 Drawing Sheets

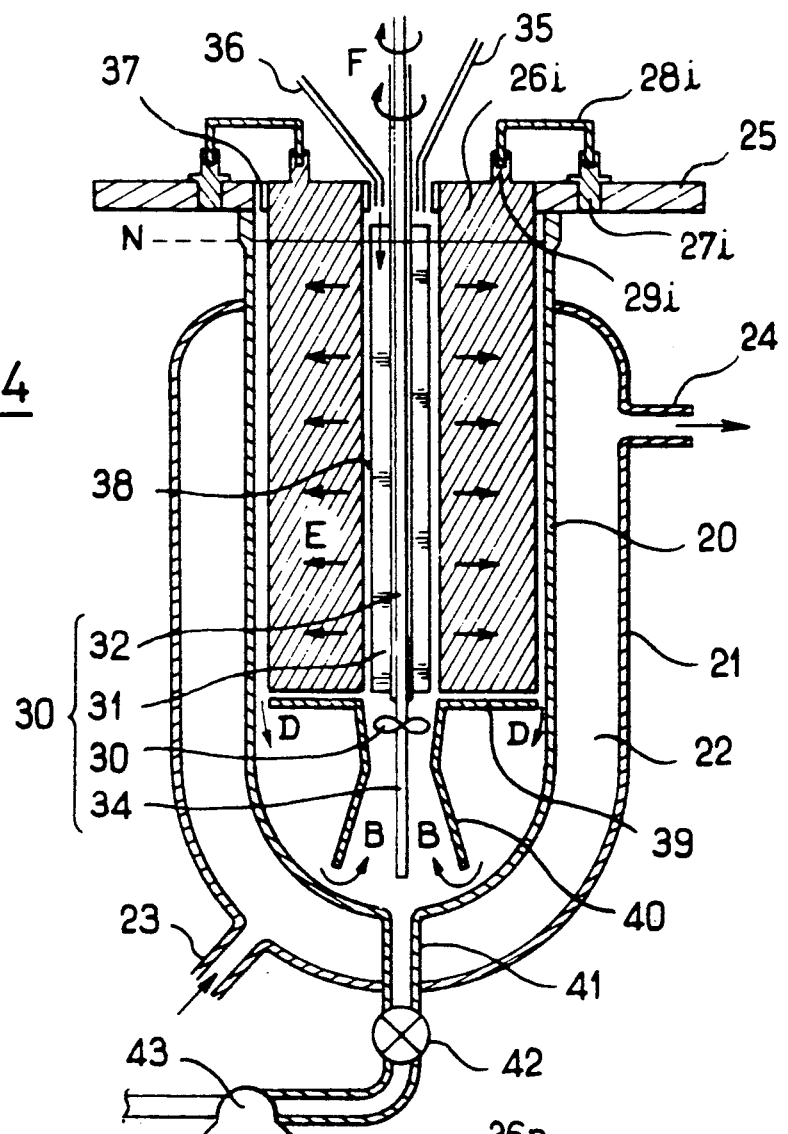
FIG_4
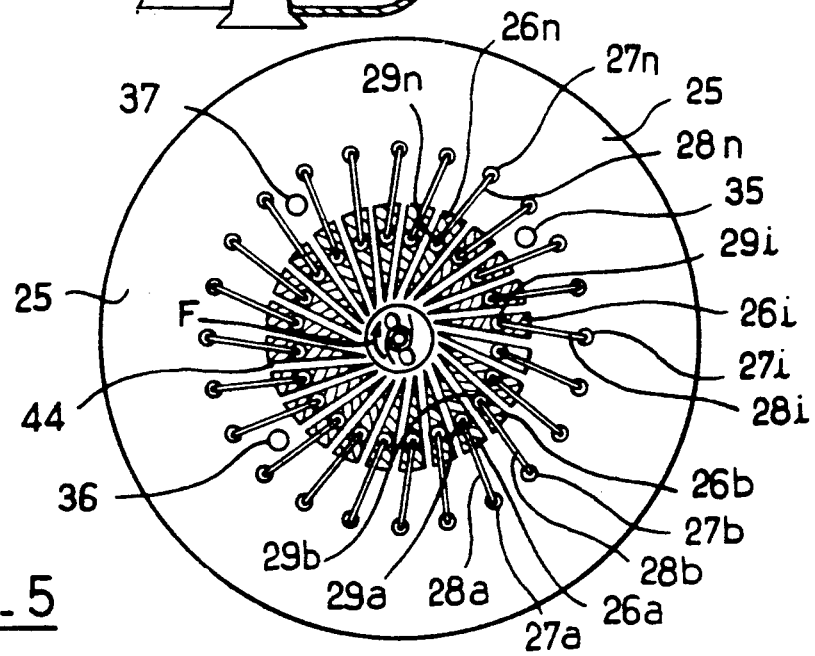
FIG_5

ELECTROLYTIC SYNTHESIS OF METAL SALTS OF WEAK ACIDS

TECHNICAL FIELD

This invention relates to the preparation of metal salts of weak acids, such as carboxylic acids, and in particular the preparation of indium formate.

This indium formate is intended particularly to be distributed on substrates brought to high temperature, in particular glass, to form, after pyrolysis, a thin layer of indium oxide. Optionally, to improve the optoelectrical performances of the layer, the indium formate can be associated with a dopant of the type containing tin, for example dibutyltin oxide (DBTO).

BACKGROUND ART

In general, compounds which are to be distributed onto substrates and pyrolyzed to form metal oxide coatings can be applied in different forms: vapor, liquid or solid.

The applicant has developed a technique of distributing such pyrolyzable compounds in a solid form, which presents considerable advantages compared to the other techniques which use vapors or liquids. This mode of distribution provides very high-performance results which, further, are particularly well suited to the formation of thin layers on a glass ribbon produced according to the float process. According to this process, the glass is produced in the form of an endless ribbon, in a width on the order of 3.5 m at a speed between 6 and 24 m/min, depending upon the specific thickness produced, and which most often is spread between 12 and 18 m/min considering the thicknesses most frequently marketed.

To be able to provide good results in the coating techniques using compounds in powder form, such powdered compounds must exhibit the determined characteristics, in particular the morphological characteristics (shape of powder grains, flowability, and the like).

Actually, for questions of rapid deposition, but also from the aspect of the quality of the coating layer, the powder grains must reach the substrate with a certain energy, therefore with a certain speed, as well as a certain weight. These grains must not, however, be too heavy for fear of leading to a series of defects risks of spots due to the explosion of too coarse grains caused by the fact of their great energy up to flames that burn at the output of the float installation, risks of blemishes due to the distinction of individual impacts of each grain, and the like.

Further, the powder must be easily transportable through all metering and distribution devices which deliver it perpendicularly to the ribbon of glass For this reason, certain forms of powder grains are better suited than others. When the metal oxide layers are on the order of a micron thick, which generally produces interference layers, it is essential that the distribution of the powder on the substrate be perfectly uniform and constant, otherwise irregularities of thickness of the coating layer results, such irregularities being evident by the local variations of properties, and in particular by variations of color visible to the eye, which thus makes the coated substrate unmarketable.

Therefore it is essential that the morphological characteristics of the produced powder be controllable.

It is known, in particular by the document of European patent 192,009, how to produce indium formate according to the following reactions:

$$In + 3HCl \rightarrow InCl_3 + 3/2\ H_2$$

$$InCl_3 + 3NH_4OH \rightarrow In(OH)_3 + 3NH_4Cl$$

$$In(OH)_3 + 3HCOOH \rightarrow In(HCOO)_3 + 3H_2O$$

This process is generally satisfactory, but the number of parameters brought into play is such that it allows the control of the morphology of the produced powder only with difficulty and then with a series of additional reactions which are both costly and time consuming. As previously mentioned, the controlled morphology powder exhibits the greatest interest for the process of pyrolysis of such powders on heated substrates, in particular, glass.

Further, this production necessitates a continual intervention, it is a consumer of large quantities of reagents, it requires a large installation and it is discontinuous.

SUMMARY OF THE INVENTION

The present invention proposes the production of metal salts of weak acids, and in particular the production of indium formate, not having the drawbacks of the standard process mentioned hereinabove but rather exhibiting the advantage of providing products having a morphology more suited to the application considered and allowing a choice of certain characteristics of products, without additional operation, in varying only certain production parameters.

The invention relates to a process of production of metal salts of weak acids, such as carboxylic acids, and in particular indium formate, by electrosynthesis, more precisely by anodic oxidation of metal (e.g., indium) in an electrolytic solution containing weak acid (e.g., formic acid) under the effect of an electric current. The salt thus obtained appears directly in the solid state in the form of crystals in suspension in the electrolytic solution from which it is easily extracted.

Advantageously, a support electrolyte is added to the electrolytic solution, in particular to improve the conductivity of the solution and thereby to increase the rate of production of the metal salt and/or to promote its precipitation.

Advantageously in certain cases, the electrosynthesis is conducted under alternating current, the anode and cathode electrodes then being of the same metal.

The invention also proposes electrosynthesis cells favoring the formation of the product to be synthesized and its extraction.

The invention also proposes products, in particular indium formate having particular morphological characteristics.

BRIEF DESCRIPTION OF THE DRAWINGS

The invention will now be described in more detail in reference to the accompanying figures wherein:

FIG. 4 represents a side view of an improved electrosynthesis cell.

FIG. 5 represents a top view of the cell according to FIG. 4, showing an advantageous form and arrangement of electrodes.

DETAILED DESCRIPTION OF THE PREFERRED EMBODIMENTS

The following description relates to the indium formate, which is the preferred material of the invention. As such, indium formate is but one example understood that the invention extends to other metal salts of weak acids, as well.

To facilitate the writing of this application, the following designations are used herein: indium formate In(COOH)3 will be written InFo3, formic acid HCOOH will be written HFo.

Figure 1:
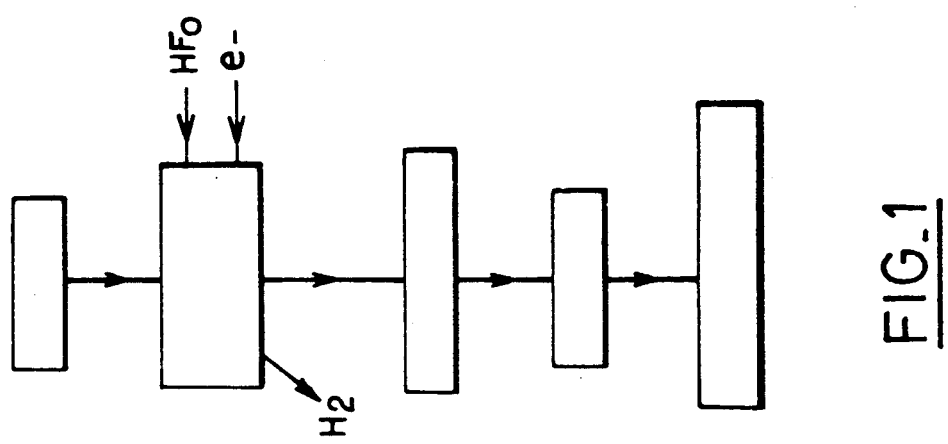
FIG. 1 represents the general diagram of the electrosynthesis of a salt of weak acid, in particular indium formate.

The production of InFo3 is conducted as indicated on the flow chart of FIG. 1.

Figure 3:
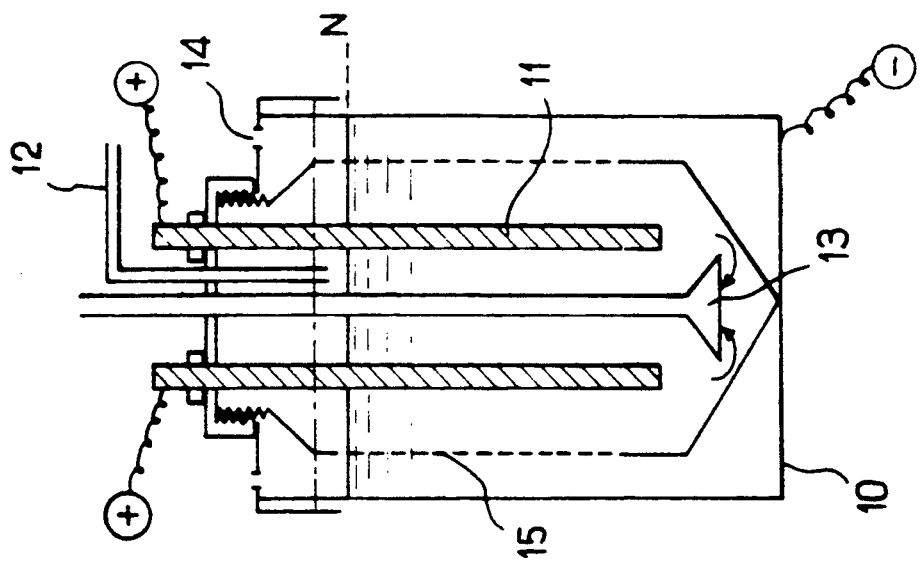
FIG. 3 represents the diagram of an electrosynthesis cell.

The metal indium is abundantly available for making the anode (or anodes) of an electrolytic cell represented in FIGS. 3, 4 and 5 and having an electrolytic solution containing HFo. Electric current is fed to the electrolytic cell, which leads, according to the overall reaction:

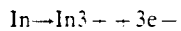

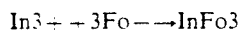

to the anodic oxidation of indium in the formic acid and secondarily to the release of hydrogen.

InFo3 appears directly in the solid state in the form of crystals in suspension in the electrolytic solution containing formic acid.

InFo3 is recovered on a filter, then dried, and it is thus available as powder.

Figure 2:
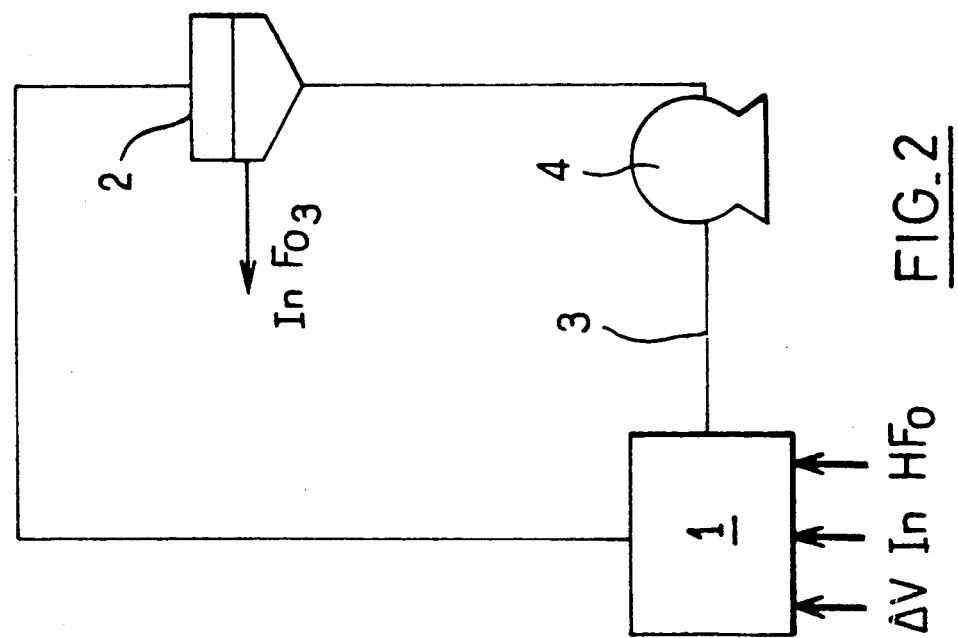
FIG. 2 represents the general diagram of a complete installation for the production of metal salt, in particular indium formate, including an electrosynthesis cell.

This synthesis of InFo3 is accomplished in an installation illustrated diagrammatically in FIG. 2. This installation comprises a cell of electrolysis 1 having In electrodes, an electrolytic solution containing HFo, and fed electric current. In this cell, InFo3 crystallizes and is available in suspension in the electrolytic solution. InFo3 is extracted from cell 1 and recovered on a filter 2, then it is taken from this filter and dried. Advantageously, the electrolyte extracted from cell 1 at the same time as InFo3 is separated during the filtering, and sent back into cell 1 by a circuit 3 including a pump 4.

One type of electrolysis cell 1 is detailed in FIG. 3, and comprises a metal tank 10 forming a cathode, in particular of stainless steel, one or more anodes 11 of indium supplied with a direct current, a pipe 12 for recycling parts of the electrolytic solution entrained with InFo3 and/or the addition of a new electrolytic solution, means 13 for extracting InFo3 from the electrolytic solution, in particular by suction, from vents 14. Advantageously, a perforated, nonconductive separator 15 is provided between opposite electrodes to avoid any short circuit.

Such an installation allows for the production of indium formate, however, certain precautions of use, certain improvements of output, have caused this basic electrolysis cell to be somewhat modified.

Thus, it appeared that at the end of a certain operating time, oxidized indium could accumulate on the anode, which could lead to a passivation of said anode. If the work is at a constant potential, the intensity of the current which flows through the electrodes then drops, or if the work is at a constant intensity, the voltage increases. A periodic cleaning of the anode allows it to continue to operate.

However, to avoid these drawbacks without periodic anode cleaning, it is proposed to use only In electrodes both as anode and cathode and periodically to reverse the polarities of the electric supply current of the electrolytic cell.

Advantageously, the periodic reversal of the polarities of the supply current is obtained in certain cases by the supply of the cell of alternating current.

If for multiplying the output of the cell the number of anodes and cathodes is increased, said anodes and cathodes can be arranged in alternating positions.

Under these conditions, if the polarities of the current are periodically reversed, the passivating deposits no longer occur and the electrodes, both the anode(s) and cathode(s), remain ever luminous and able to decompose to lead to the formation of InFo3.

Further, to promote the formation of InFo3 and its elimination from the electrolytic solution, it is advantageous to agitate said solution. Thus InFo3 formed close to the electrodes is carried far from these electrodes. At the same time, this agitation avoids the accumulation of indium ions on the surface of the electoolytic solution and the formation of passivating deposits on the electrodes.

This circulation is also advantageously organized for simultaneously favoring the evacuation of coarse particles of InFo3 formed and the recycling of finer particles to give them the possibility of growing in size. However, the agitation must not be too great, for fear of making the coulometric output of the electrosynthesis lower.

Further, it is advantageous to monitor the temperature of the electrolytic solution, on one hand, to eliminate, at least partially, the heat produced naturally during the synthesis, and on the other hand to choose the operating temperature which influences the output of the synthesis and the morphology of the powder produced.

Thus, it appears that the lower the temperature, the smaller the size of the particles produced, and that the coulometric output increases when the temperature decreases. For all these considerations, a temperature close to room temperature, i.e. on the order of 10° to 20° C. and preferably from 15° to 20° C., is used for the production of indium formate powder which is intended to be used to make thin, pyrolyzed indium oxide layers on glass. Higher temperatures also lead to the formation of particulate InFo3, but the particles formed are too long (needle-shaped) for the application considered, at least with current technology However, if it were desired to produce particles in the shape of a needle, it would be advisable to work at a temperature higher than 30° C.

Also, the nature of the electrolytic solution is significant. Thus, different additions of support electrolytes can be made to the electrolytic solution, i.e., HFo for example, to improve the precipitation of InFo3 the pH can be adjusted These additions also contribute to assuring or increasing the conductive power of the electrolytic solution, to avoiding or reducing the passivation of the electrodes: they make the output of the synthesis operation vary and act on the morphology of the product finally obtained.

Of the possible additions, the addition of adjuvants, such as amines, can be mentioned. For example triethylamine, preferably at a medium concentration on the order of 1.5 M to 2.5 M, can be utilized when operating under 4.5 volts. Weaker concentrations lead to the drawback of a passivation of the electrode so that alternating the operation does not compensate. On the other hand, too high concentrations slow down the precipitation of indium formate by increasing its solubility in the solution. Other salts, in particular the alkaline formates (NaFo, NH4Fo) useful at the above-mentioned concentration, Fo designating the formate according to the conventions laid down at the beginning, also cause this effect. It is also essential that the added amines not form a complex with the metal whose salt it is desired to produce, in this case, with indium. The approximate limits of 1.5 M to 2.5 M are a function of the working voltage and when this voltage increases, these numbers should be increased.

The addition of acid adjuvants not yielding indium salts such as perchloric acid or trifluoromethane sulfonic acid (TFMS), or salts, in particular the perchlorates, such as $LiClO_4$ or the tetrafluoroborates whose anions do not precipitate with indium, can also be cited. Thus by adding $LiClO_4$ in HFo at a concentration of 1 M, the current density is multiplied by approximately 100 and the output of the synthesis operation is thus increased appreciably.

To avoid the danger of perchloric acid or perchlorates, trifluoromethane sulfonic acid is advantageously substituted for them, for example at a 0.1 M concentration. Tetrafluoroborates can also be used, if desired. However, the acid additions must not be too large for fear of interfering with the precipitation of indium formate. With TFMS, the limit of acidity is on the order of 1 M and preferably on the order of 0.1 M to 0.5 M under a working voltage on the order of 2 volts, these concentrations increase when working under higher voltages. Preferably, when the electrolytic solution is acid (compared to HFo considered as a solvent), the supply of the cell is however in direct current.

Some of these principles can be used in the cell shown in FIG. 3, in particular those relating to adjustments of temperature, pH, the nature of the electrolytic solution, the agitation.

However, FIGS. 4 and 5 show a cell of improved electrolysis in which all the principles mentioned above can be put in practice.

This cell is made of a tank 20 surrounded by a casing 21, a cooling and in general thermostatically controlled liquid 22 being able to circulate between the two by being introduced through intake 23 and in being extracted through outlet 24.

The tank is surmounted by a plate 25 which supports electrodes 26a, 26b, ..., 26i, ..., 26n, ..., power lead-ins 27a, 27b, ..., 27i, ..., 27n, ..., jumper links 28a, 28b, ..., 28i, ..., 28n, ..., connection of studs 29a, 29b, ..., 29i, ..., 29n, ..., solid with each electrode with power lead-ins such as 27i, agitation equipment 30, recycling pipes 35, equipment for introduction additions 36, holes 37 of vents or suction of gases formed, hydrogen in particular. Tank 20 is preferably cylindrical with a vertical axis, a space 38 is reserved in its center around its vertical axis and electrodes 26i are distributed on the periphery of this space 38 over the major part of the height of the tank. Agitation equipment 30 is lodged in this space 38. This equipment comprises a rotor 31 driven by a revolving vertical shaft 32 centered on the axis of tank 20 held by bearings located in the high part and not represented, driven by motorized means also not represented, and also comprises a propeller 33 located in the low part of space 38 under rotor 31 and electrodes such as 26i, mounted on a revolving vertical shaft 34 concentric with shaft 32, driven by motor means not represented at a speed which can be different from that of shaft 32.

This tank 20 possesses an intermediate bottom 39 forming a baffle perpendicular to its vertical axis placed below electrodes such as 26i, pierced in its center for the passage of agitation means 30. This intermediate bottom is solid with a deflector 40 with a surface of revolution, placed under it and surrounding agitation means 30, in particular propeller 33 and its shaft located at this level. This deflector 40 descends to the proximity of the bottom of tank 20 reserving, however, between this bottom and itself a space for the circulation of the electrolytic solution. Similarly, spaces are reserved on the periphery of electrodes 26i, and of intermediate bottom 39, up to the side wall of tank 20 to allow the circulation of the electrolytic solution. A duct 41 for drawing off the electrolytic solution charged with indium formate, equipped with a valve 42 and a pump 43 to regulate the drawing-off flow is provided in the bottom of tank 20, preferably in the center. Electrodes such as 26i are installed by being introduced through orifices corresponding to their section, through plate 25, and they slide to their final position shown in FIG. 4, by being guided by lateral slides solid with plate 25, not represented in the figures and forming a basket which holds them.

Advantageously, electrodes such as 26i all have the same shape and, on one hand, for effectively occupying tank 20 of cylindrical shape and exhibiting the maximum surface able to decompose, and on the other hand, for facilitating the circulation of the electrolyte and holding the current lines perpendicular to the faces of the electrodes, said electrodes are of a prismatic shape with an approximately triangular section seen in FIG. 5.

Also preferably, spaces 44, between electrodes 26i, are constant from the central edge of the electrodes to their peripheral edge close to the side wall of the electrolytic cell, which allows a flow of liquid in these spaces 44 at a constant speed, causing regular and homogeneous wear on the surface of the electrodes.

Preferably, in particular to facilitate the expulsion of liquid between the electrodes under the effect of agitation elements 30 and in particular of rotor 31, electrodes 26i and spaces 44 are not exactly in a radial position, their position is slightly twisted, i.e., the points of electrodes 26i of prismatic shape are staggered around the central vertical axis of the cell in a direction opposite to the direction of rotation of agitation elements 30 and in particular rotor 31, marked by arrow F, as seen in FIGS. 4 and 5.

FIGS. 4 and 5 show in detail the electric circuit which allows, thanks to movable jumper links such as 28i, for the establishment of an electric junction between studs 29i belonging to electrodes and power lead-ins 27i attached and solid with plate 25. Thus in raising a jumper link such as 28i, it is possible to cut off the corresponding electrode i, then to raise it and remove it by the outlet of the cell when it is used, for example, to replace it with a new one, the other electrodes continuing to be under voltage and the cell continuing to operate.

This operation of changing the electrode previously described and the composition of electrolytic solution consumed are the only operations to accomplish to maintain the electrolytic cell in operation.

This cell shown in FIGS. 4 and 5 operates as described below. At the start, electrodes such as 26i are placed in their baskets hooked under plate 25, the electrolytic solution is introduced into tank 20 to reach the level marked N, the circulation of the thermostatically controlled liquid is started, rotor 31 and propeller 33 are rotated. There follows a flow of electrolytic solution in a horizontal plane from the center toward the periphery of tank 20 through spaces 41 between the prismatic electrodes according to arrows E of FIG. 4 and also in all the vertical planes centered on the axis of tank 20, a loop circulation, descending to the periphery of the tank according to arrows D of FIG. 4 and ascending along the axis of the tank inside deflector 40 as indicated by arrows B, under the effect of revolving propeller 33.

When the electric connection is made between electrodes 26i and their respective power lead-ins, the reaction of decomposition of the electrodes and the recombination of the indium ions formed with the formate ions takes place, thus creating within the electrolytic solution as a result of the nature of the solution, of its pH in particular, indium formate in solid form in suspension.

The coarsest particles formed entrained by the flow of liquid are entrained toward the bottom of tank 20 where they are eliminated through drawing-off duct 41, the drawing-off flow being able to be constant and being adjusted by valve 42 and to pump 43 The finest particles can be re-entrained in the rising flow of liquid according to arrows B of FIG. 4 if the effect created by propeller 33 is great enough, therefore, if the speed of rotation of this propeller is sufficient. Consequently the speed of rotation of propeller 33 influences the recycling of the particles formed, therefore their size at the time of their evacuation from the electrolytic solution.

The choice of temperature of the electrolytic solution is easy since it is sufficient to vary the temperature of thermostatically controlled fluid 22 circulating in the space between the wall of tank 20 and casing 21 to obtain the desired temperature of the electrolytic solution.

During the operation of the electrolytic cell, the electrodes wear away gradually and the wear of said electrodes is homogeneous as a result in particular of their regular spacing, their shape and their direction which makes the lines of current at each place perpendicular to their faces, also because of the central agitation which creates a regular and uniform irrigation of all the electrodes, the size of this irrigation being able to be adjusted in acting on the speed of rotation of rotor 31 independently of the speed of rotation of propeller 33.

The characteristics of the cell are kept during operation, despite the wear, only the size of spaces 41 between the electrodes gradually increases.

During the operation, to compensate for the losses of electrolytic solution, an addition of new electrolytic solution can be made by equipment 36.

When the electrodes are worn, they an be changed, without it being necessary to interrupt the operation of the whole electrolytic cell. The unconsumed parts of the worn electrodes can be remelted (melting temperature of indium is 156° C.) then cast in a mold, in particular of teflon in the prismatic shape desired and then reused.

Preferably for favoring the operation with direct current, several filters for recovery of indium formate in the electrolytic solution drawn off or a band filter of constant operation can be used.

Batteries of electrolytic cells of the type of cell described in FIGS. 4 and 5 can be made. For example, it is indicated that such a cell containing 10 liters of electrolytic solution, supplied with an alternating current of 240 amperes, delivers approximately 1 kg of $InFo_3$ per hour, which considering the dimensions, the slight equipment investment made, the automatic operation practically without intervention except for changing corroded electrodes and adjusting the level of electrolytic solution, the quality of the product produced, constitutes a very interesting performance.

Thanks to this process, an action on the different parameters governing the reaction is possible and from it results the possibility of producing the desired products having the optimal characteristics suited to the process of pyrolysis on glass for which said products are intended.

Thus the powder produced can possess, without additional treatment, the size and shape desired. Said needle-shape of the grains, characterized by a great length compared to the width or the diameter can be attained in the production process.

Needles can be defined by a ratio of length to width (or diameter) greater than 5. (L/w ratio greater than 5).

According to the invention, if desired, although this is not preferred for the process of pyrolysis on glass, the parameters of operation of the cell of electrolysis can be adjusted to obtain grains having a length up to approximately fifty micrometers and a width as small as approximately 1 micrometer, which corresponds to an L/w ratio on the order of 50.

The application of powder pyrolysis, in particular containing indium formate, rather requires grains called rods, i.e. having a length little different from the width and in general such that L/w is less than 5. Adjusting the parameters of the electrosynthesis to obtain the rods whose L/w is less than 5 is therefore sought. Lengths and widths of grains are not perceived directly; only the apparent diameters of the grains given by a granulometer, in particular a laser diffractometer, and photographs of grains under a microscope, are accessible. However, lengths and widths can be respectively classed as d90 and d10 supplied by the granulometer. d90 being a representation of the distribution of grains as a function of their apparent diameter, the diameter below which 90% of the mass of the grains present can be counted, d10 being the diameter below which only 10% of the mass of the grains can be counted.

For the requirements of the pyrolysis on glass, grains are chosen whose d10 and d90 are respectively 5 and 25 microns, or, in other words, whose apparent diameters are between 5 and 25 microns.

In particular, as already mentioned, room temperature is chosen for the process, since too high of a temperature leads to the formation of needles of $InFo_3$. The powders thus produced having the desired characteristics are perfectly suited to the coating of glass by pyrolysis. Their pyrolysis output is higher than that obtained with the powders produced according to the standard process before grain size adjustment, this output being able to be expressed in the thickness of the layer made with, for example, 1 g of powder at a given temperature, for example, 600° C., under standardized pulverizing conditions. Thus, with the indium formate according to the invention, thicknesses on the order of more than 350 nanometers are obtained This is a figure higher than the irregular figures obtained with the powder produced by traditional processes.

The constancy of quality of the produced powder is also an important factor, constancy not found with conventionally produced powders.

What is claimed is:

1. A process for producing metal salts having controllable morphological characteristics by anodic oxidation of a metal which comprises:

providing an electrolytic cell having at least one metal anode immersed in an electrolytic solution comprising a weak acid which is little or not at all capable of oxidizing said metal anode and an support electrolyte comprising an amine which does not react with said metal, said support electrolyte provided in an amount sufficient to improve the conductivity of the electrolytic solution to thereby increase the rate of production of the metal salt and to adjust the pH of said electrolytic solution to a basic value;

passing a sufficient amount of an alternating electric current through said metal anode to effect anodic oxidation thereof, thus producing a metal salt of said weak acid which salt is insoluble in the electrolytic solution; and recovering said metal salts having said controllable morphological characteristics from said electrolytic solution in the form of particles.

2. The process of claim 1 wherein said amine is triethylamine.

3. The process of claim 1 wherein a plurality of anodes and cathodes are provided in said cell and wherein said anodes and said cathodes are formed of the same metal.

4. A process for producing indium metal salts having controllable morphological characteristics by anodic oxidation of indium metal which comprises:

providing an electrolytic cell having at least one indium metal anode immersed in an electrolytic solution comprising a weak acid which is little or not at all capable of oxidizing said indium metal anode and a support electrolyte comprising alkaline formate which does not react with said indium metal, said support electrolyte provided in an amount sufficient to improve the conductivity of the electrolytic solution to thereby increase the rate of production of the indium metal salts and to adjust the ph of said electrolytic solution to a basic value;

passing a sufficient amount of an alternating electric current through said indium metal anode to effect anodic oxidation thereof, thus directly producing an indium metal salt of said weak acid dispersed in the electrolytic solution, which salt is insoluble in the electrolytic solution; and recovering said indium metal salts from said electrolytic solution in the form of particles, said indium metal salts having morphological characteristics including the shape, form, weight and flowability of said particles which are controllable by said process.

5. The process of claim 4 wherein a plurality of anodes and cathodes are provided in said cell and wherein said anodes and said cathodes are formed of the same metal.

* * * * *

UNITED STATES PATENT AND TRADEMARK OFFICE
CERTIFICATE OF CORRECTION

PATENT NO. : 5,104,498
DATED : April 14, 1992
INVENTOR(S) : Jean Pegouret

It is certified that error appears in the above-indentified patent and that said Letters Patent is hereby corrected as shown below:

The title page, showing the illustrative figure, should be deleted and substitute therefor the attached title page.

In the drawings, Figure 1, should be deleted and substitute the corrected Figure 1, as shown on the attached page.

Signed and Sealed this

Twenty-eighth Day of September, 1993

Attest:

BRUCE LEHMAN

Attesting Officer     Commissioner of Patents and Trademarks

United States Patent [19]

Pegouret

[11] Patent Number: 5,104,498

[45] Date of Patent: Apr. 14, 1992

[54] ELECTROLYTIC SYNTHESIS OF METAL SALTS OF WEAK ACIDS

[75] Inventor: Jean Pegouret, Paris, France

[73] Assignee: Saint-Gobain Recherche, Aubervilliers Cedex, France

[21] Appl. No.: 294,247

[22] Filed: Jan. 6, 1989

[30] Foreign Application Priority Data

Jan. 8, 1988 [FR] France ................ 88 00131

[51] Int. Cl.⁵ .................................................. C25B 1/22
[52] U.S. Cl. .................................... 204/59 R; 204/59 QM
[58] Field of Search .................. 204/59 R, 59 QM, 78, 204/79

[56] References Cited

U.S. PATENT DOCUMENTS

| 1,879,842 | 9/1932 | Conradty | 204/252 |
| 3,964,983 | 6/1976 | Eisenbach et al. | 204/59 QM |
| 4,104,140 | 8/1978 | Eisenbach et al. | 204/78 |
| 4,647,349 | 3/1987 | Kreh et al. | 204/59 R |
| 4,859,499 | 8/1989 | Sauvinet | 427/108 |

FOREIGN PATENT DOCUMENTS 2260658 4/1974 Fed. Rep. of Germany

OTHER PUBLICATIONS

Habeeb et al., "Co-ordination Compounds of Indium. Part XXI. Some Compounds Derived from Indium Acetate, including Indium Diacetate", J. Chem. Soc., Dalton Trans. (3), pp. 243-247 (1973).

Baizer et al., "Organic Electrochemistry an Introduction and a Guide" 2nd ed. Marcel Dekker, Inc. N.Y. pp. 211-214, 601-602.

Primary Examiner—John Niebling
Assistant Examiner—Steven P. Marquis
Attorney, Agent, or Firm—Pennie & Edmonds

[57] ABSTRACT

The invention relates to the synthesis of metal salts of weak acids and in particular indium formate.

It proposes a process in which the anodic oxidation of metal is achieved under the effect of electric current in a cell filled with an electrolytic solution containing weak acid whose salt it is desired to produce, having at least its anode or anodes consisting of metal whose salt it is desired to produce. The salt is available in suspension in the electrolytic solution.

The invention also proposes an electrosynthesis cell, as well as products synthesized in a particular morphology.

The invention applies itself to the synthesis of indium formate in particular to pyrolyze it as a thin layer on glass.

5 Claims, 2 Drawing Sheets

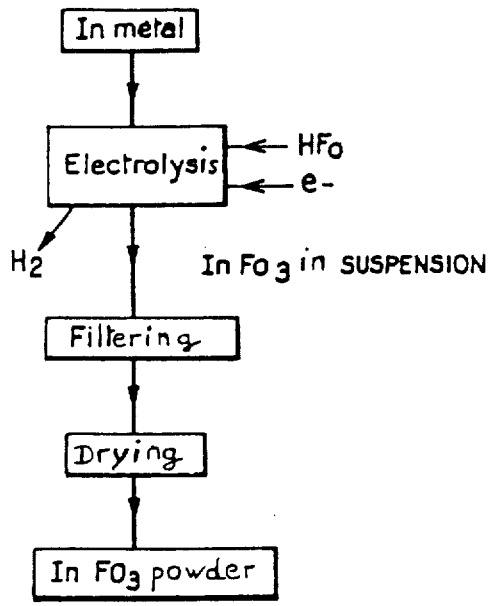

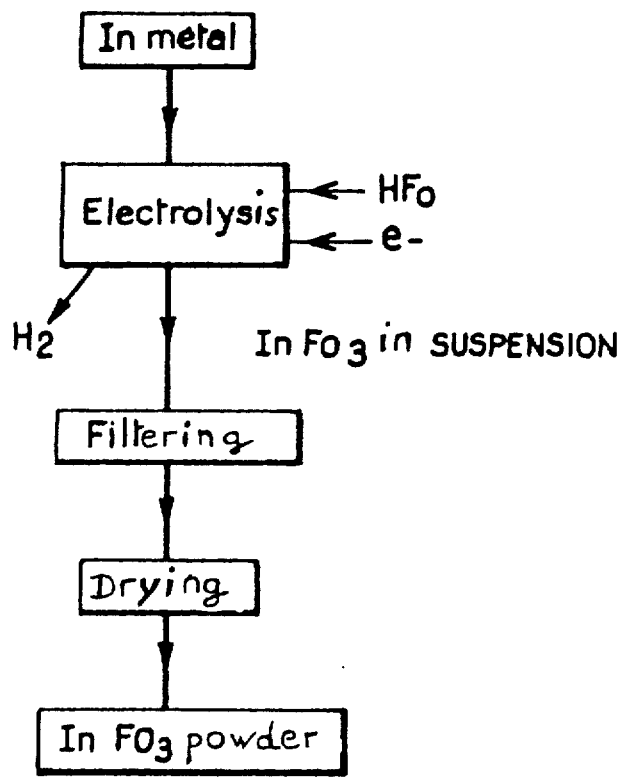
FIG_1